UNITED STATES PATENT OFFICE.

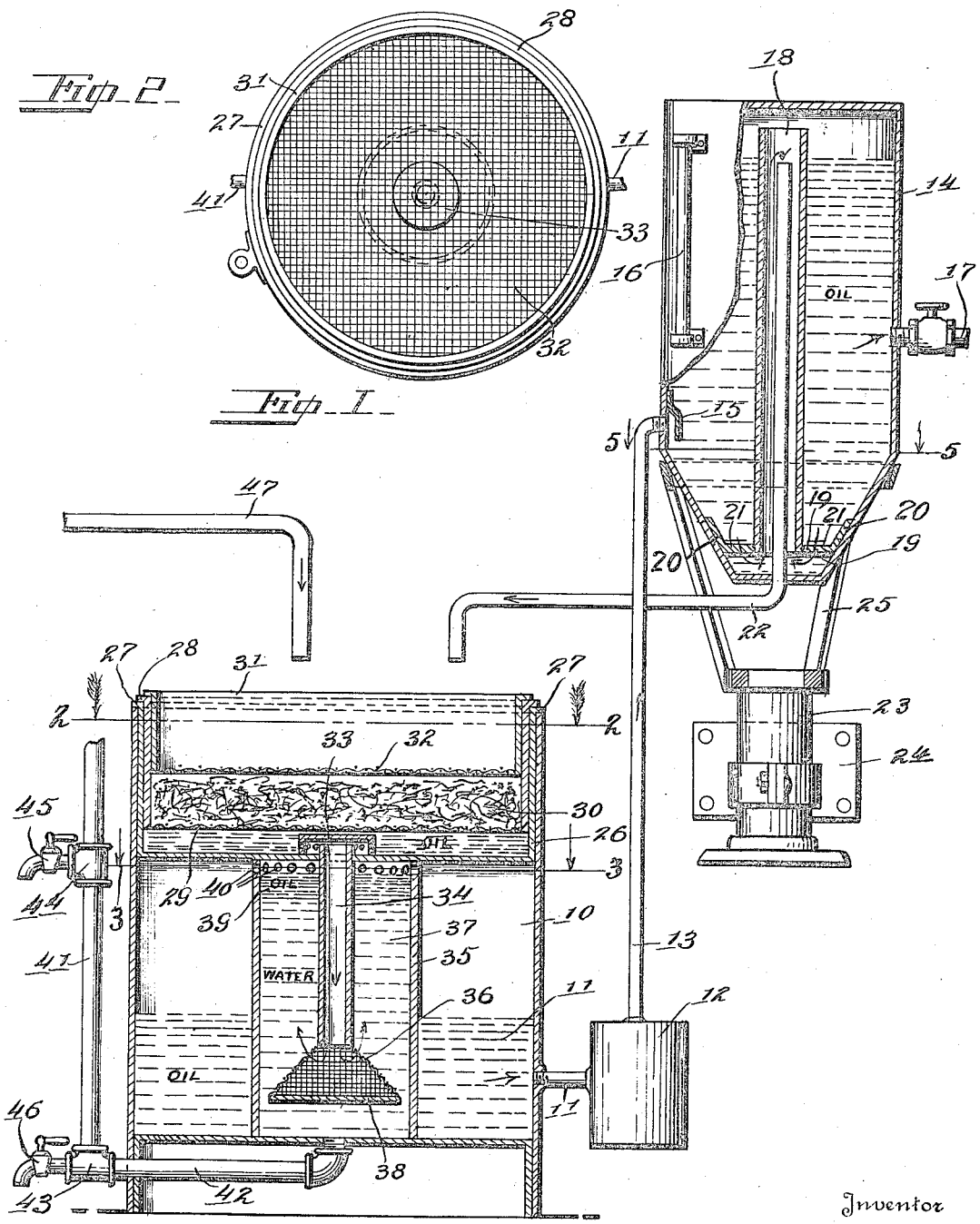

FRANCIS F. EMORY, OF FITCHBURG, MASSACHUSETTS.

OIL-FILTER.

1,148,834. Specification of Letters Patent. Patented Aug. 3, 1915.

Application filed February 18, 1914. Serial No. 819,518.

*To all whom it may concern:*

Be it known that I, FRANCIS F. EMORY, a citizen of the United States, residing at Fitchburg, in the county of Worcester and State of Massachusetts, have invented certain new and useful Improvements in Oil-Filters, of which the following is a specification.

This invention relates to an improved oil filter, and the principal object of the invention is to provide a filter which is so constructed that waste oil flowing from the drip cup of bearings and shaftings may be thoroughly cleaned and purified, and thus again made fit for use.

Another object of the invention is to so construct the filter that the pan which carries the filtering material may be removed and the filtering material thus easily removed and new filtering material put in place.

Another object of the invention is to so construct the receptacle for the filtering material that this material will be compressed by any waste resting upon it.

Another object of the invention is to provide an improved type of reservoir into which the purified oil is pumped, and to so construct the reservoir that when the reservoir becomes too full of oil, the excess oil may flow back into the filter.

This invention is illustrated in the accompanying drawings wherein—

Figure 1 is a sectional view showing the general arrangement of the filter storage tank or reservoir; Fig. 2 is a top plan view of the filter and shows a modified form.

Referring to Fig. 1 the general arrangement of the filter will be readily understood. In this figure the numeral 10 indicates the main tank of the filter in which the cleaned oil 11 is held before being sucked from this tank through the pipe 11 by means of the pump 12 and then forced through the pipe 13 into the reservoir 14. A baffle plate 15 is secured to the wall of the reservoir and extends across the inner end of the pipe 13 so that the oil passing through this pipe 13 will be caused to travel toward the lower end of the reservoir before passing upwardly. A sight glass 16 is provided for showing the height of the oil in the reservoir and a valve controlled outlet pipe 17 is connected with the reservoir so that oil may be drawn from the reservoir and led to the bearings of any desired machinery. A sleeve 18 which is carried by the support 19 extends vertically through the reservoir from a point adjacent the bottom of the reservoir to a point above the normal oil level of the reservoir. This sleeve is open at both ends and has its lower end threaded into the central portion of the support 19, the end portions 20 of the arms 21 of the support 19 being secured to the reservoir in any suitable manner. An overflow pipe 22 extends through the sleeve 18 from a point adjacent the upper end of the sleeve and at approximately the normal oil level of the reservoir. This pipe 22 extends through the bottom of the reservoir and is carried to a point above the filter so that when the reservoir is filled with oil beyond a desired amount, the oil will flow through the overflow pipe 22 and back through the filter. This reservoir should be mounted at a higher level than the filter and therefore stand 23 has been provided, which stand may be placed upon a shelf or may be engaged by a bracket 24. The upper portion of the stand forms a saddle 25 in which the tapered lower end portion of the reservoir rests as shown in Fig. 1.

A pan 26 is mounted in the tank 11 and supported by means of its flange 27 which engages the upper edge of the tank.

A second pan 28 is mounted in the first pan 26 and is provided with a fabric bottom 29 which is preferably formed of wire so that oil may be passed through this pan 28 into the bottom of the pan 26.

A suitable filtering material 30 such as waste, cloth, or any other material which will filter oil is placed in the pan 28 and is held in place by means of a third pan 31 which is also provided with a fabric bottom 32. This fabric bottom 32 which has been shown as wire has been provided so that oil may pass through the pan 31 onto the filtering substance 30. The pipe 22 has its outlet end overhanging the pan 31 and the pipe 47 which leads from the drip pans of the oil cups and shaftings of the machinery also overhangs the pan 31.

It will thus be seen that the dirty oil which falls from the drip pans and which is of course filled with dust and other dirt from the machinery will pass through the fabric 32 and then through the filtering substance 30. As the oil passes through the fabric bottom 32, the larger particles of dirt and dust will be strained out and as the oil passes through the filtering material 30, the finer particles of dust and dirt will be removed. The oil in the pan 26 beneath the pan 28 will therefore be comparatively clean. This oil will pass through the opening in the cap 33 and into the pipe 34 which passes downwardly into the chamber 35 positioned in the lower portion of the tank 10. After the oil reaches the bottom of the pipe 34, it passes through the wire 36 which is connected with the lower end of the pipe 34 and up through the water 37 in the chamber 35. A disk 38 is carried by the wire 36 and prevents the oil from passing out of the pipe 34 without passing up through the wire. As the oil passes through this wire, it is broken up into a large number of fine particles which rise in the water to the top of the chamber where they collect to form a solid mass of oil as shown at 39. All the foreign liquids in the oil, such as water or the like, will thus be removed from the oil and the clean oil will now pass out through the openings 40 into the bottom of the tank 10.

A water supply pipe 41 is connected with a branch pipe 42 which leads from the base of the chamber 35 by means of a coupling 43. A coupling 44 is positioned in the pipe 41 at a point adjacent the bottom of the pan 26 so that a spigot 45 which leads from the coupling 44 will be positioned at approximately the same height as the openings 40. A second spigot 46 is connected with the coupling 43 so that water may be drawn out of the chamber 35 and the chamber thus emptied when it is desired to clean the filter.

The operation of this device is as follows: The waste oil from the bearings and shaftings flows through the pipe 47 into the pan 31. This oil will then pass from the pan 31 through the filtering material 30 into the bottom of the pan 26 and through the openings in the cap 33 into the pipe 34. The oil will then pass up through the water in the chamber 35 and out through the openings 40 into the tank 10. The pump 12 will remove the oil from the tank 10 and force it through the pipe 17 which leads to the bearings and shaftings. The oil is then returned to the filter by means of the pipe 47. When the reservoir is filled beyond a desired amount, the oil overflows into the pipe 22 and returns to the filter, carrying any sediment back to the filter.

This filter may be either rectangular in cross section or may be any other suitable shape, such as cylindrical, as shown in Fig. 2. When it is desired to clean this filter, the pan 28 is first removed and after the pan 31 has been removed from the pan 28, the filtering material can be removed and either cleaned and replaced or new filtering material put in place. The water in the chamber 35 is drawn and fed through the spigot 46 and after the oil has flowed out of the pan 26, the pan 26 can be cleaned and the pan 28 can be put in place.

What is claimed is:

A reservoir provided with a tapered lower end portion, a supporting member mounted in the tapered lower end portion of said reservoir and provided with arms engaging the walls thereof, an open ended sleeve carried by said supporting member and extending to a point above the normal fluid level of said reservoir, and an overflow pipe extending through the bottom of said reservoir and through said sleeve to a point in said sleeve at the normal fluid level of said reservoir.

In testimony whereof I affix my signature in presence of two witnesses.

FRANCIS F. EMORY.

Witnesses:
MARY C. HALL,
EMERSON W. BAKER.